United States Patent

Glass, III et al.

[11] Patent Number: 5,178,820
[45] Date of Patent: Jan. 12, 1993

[54] TOOL POSITIONING ASSEMBLY

[75] Inventors: Samuel W. Glass, III, Lynchburg; Francis C. Klahn, Huddleston; Joseph G. Steinbrunner, Lynchburg, all of Va.

[73] Assignee: B&W Nuclear Service Company, Lynchburg, Va.

[21] Appl. No.: 755,983

[22] Filed: Sep. 6, 1991

[51] Int. Cl.$^5$ .............................................. G21C 19/00
[52] U.S. Cl. ................... 376/260; 165/11.2; 165/76; 901/1
[58] Field of Search ............ 376/260, 249, 204; 165/11.2, 76; 901/1, 15, 16, 41, 44; 414/4; 29/890.31, 428, 723, 726

[56] References Cited

U.S. PATENT DOCUMENTS

| | | | |
|---|---|---|---|
| 4,037,730 | 7/1977 | Fetzer et al. | 901/37 |
| 4,168,782 | 9/1979 | Sturges, Jr. | 165/76 |
| 4,561,816 | 12/1985 | Dingess | 165/11.2 |
| 4,595,419 | 6/1986 | Patenaude | 901/44 |
| 4,696,612 | 9/1987 | Germond et al. | 165/11.2 |
| 4,984,627 | 1/1991 | LeBourgeois | 376/260 |

Primary Examiner—Daniel D. Wasil
Attorney, Agent, or Firm—Robert J. Edwards; D. Neil LaHaye

[57] ABSTRACT

A tool positioning assembly for use inside a steam generator. A loading tool assembly removably attachable to a support base is used to insert the support base into the steam generator through a manway opening. The support base is removably attached to the steam generator at the manway. A retractable foot assembly pivotally attached to the support base stabilizes the support base inside the steam generator. A track assembly, removably attachable to the support base after removal of the loading tool assembly, receives an arm. A driven cogwheel on the waist of the manipulator engages a rack on the track assembly and support base for selectively driving and positioning the arm thereon. A tool coupling mounted on the arm is adapted to receive remotely controlled tools. The four degree-of-freedom movement of the arm provides access to all tubes in the tubesheet and allows mounting of tools outside the steam generator.

2 Claims, 5 Drawing Sheets

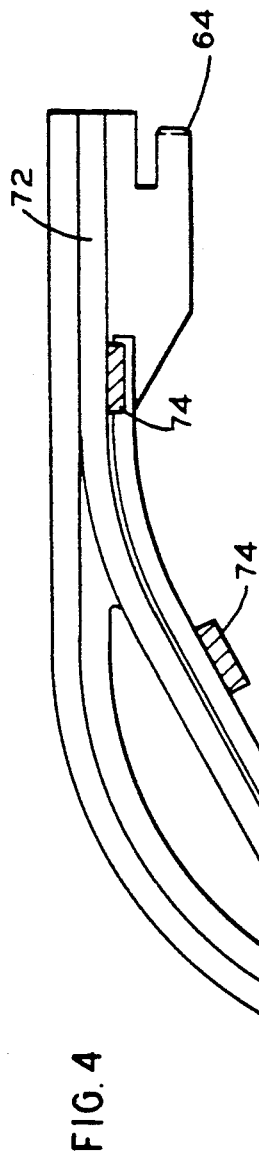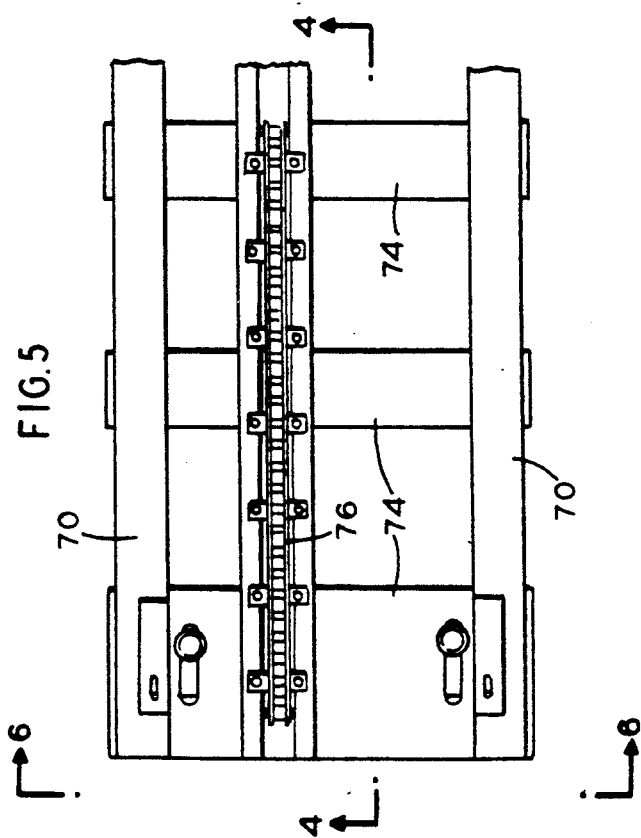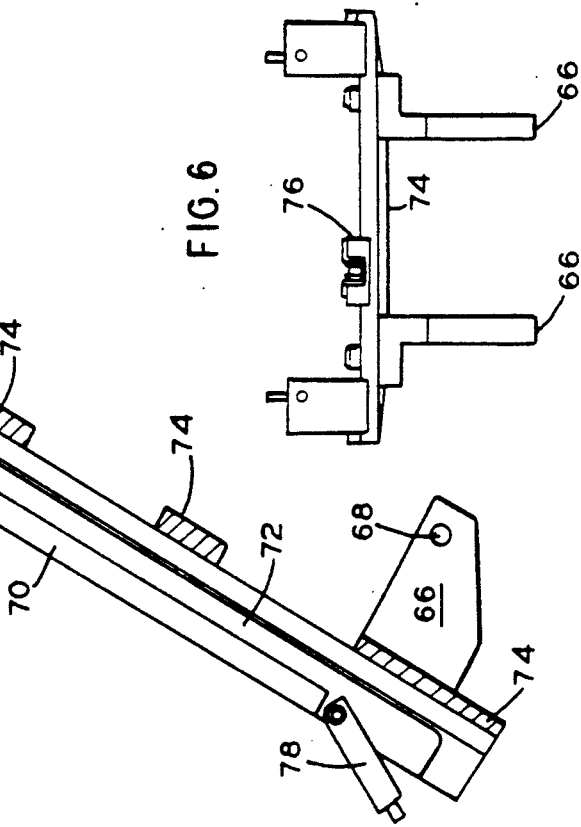

TOOL POSITIONING ASSEMBLY

BACKGROUND OF THE INVENTION

1. Field of the Invention

The invention is generally related to tool positioning assemblies and particularly to a tool manipulator assembly for use inside a steam generator.

2. General Background

Nuclear power plant steam generators are water to water heat exchangers. Heat is transferred from the pressurized primary. coolant to the secondary coolant. The secondary coolant is transformed into steam to drive the turbine generators. Primary coolant enters the steam generator from the reactor vessel via the inlet or hot leg plenum. As the fluid passes through the plurality (3000-15,000) of heat exchanger tubes, heat is transferred across the tube surface to the secondary fluid. The primary coolant then exits through the steam generator outlet plenum. The ends of the heat exchanger tubes pass through and are captured in a thick plate called a tubesheet. The tubes and tube sheet form the boundary between the primary and secondary coolant. The secondary coolant flows through the cylindrical chamber which encircles the heat exchanger tube bundle.

The codes and standars which regulate the nuclear industry require heat exchanger tubes inside of a steam generator be inspected on a regular basis. Further, individual tubes must be repaired or taken out of service as indicated by the results of the required inspections. Access to the tubes is gained via flanged openings in both the inlet and outlet plenums called manways. The surfaces of the plenums are contaminated with radioactive material. Radiation dose rates and airborne coontamination level inside the plenum dictate restrictive controls on a worker entering the plenums. These restrictions include protective clothing, respiratory protection, and time limits. These restricitons coupled with an industry wide move to reduce occupational radiation exposure have forced steam generator service vendors to use remotely operated manipulators to perform steam generator repair and inspection services.

The primary feature of an advanced remote steam generator manipulator is to minimize personnel radiation exposure. This is accomplished by designing the manipulator for remote installation and removal and by having the ability to change tool heads without personnel breaking the manway plane. Secondary features include precise positioning and tool alignment at each tube location, aequate strength and stiffness to support various repair tasks, rapid positioning speed, high reliability, and fail-safe design features to minimmize the potential for damage to the steam generator.

Several manipulator designs are known. Hydraulically operated designs provide strength-to-weight advantages. However, concerns over leakage of hydraulic fluid into the steam generator have minimized use of such systems. Electric or pneumatic systems used may be generally grouped into fingerwalker, mast mount, or manway mount types. Fingerwalker types are designed to hang from and walk along the tubesheet. This design suffers from slow travel speeds. It also can not accommodate large numbers of plugged tubes which may prevent one or more fingers from engaging in the tubesheet. There is also the potential for the device to fall from the tubesheet. Mast mount tubes are designed to operate from a mast bridging between the tubesheet and the bowl bottom of the generator. The mast prevents access to certain tubes and must be moved to allow access to those tubes. Manipulator installation and tool changes can also be difficult and require partial entry by personnel into the generator. This increases radiation exposure. Problems associated with known manway mount manipulators include poor stiffness, limited lift capacity, blockage of the manway, limited vertical travel, and the need for manned entry into the steam generator for toolhead changes.

It can be seen that a need exists for a tool manipulator for use inside a steam generator that solves the above problems.

SUMMARY OF THE INVENTION

The present invention addresses the aforementioned need. What is provided is a manway mount manipulator assembly that allows installation, tool changes, steam generator service, and removal of the manipulator assembly without the need for personnel to break the plane of the manway. A support base is inserted into the steam generator through the manway using an installation tool attached to the support base. The support base is mounted to the steam generator at the manway opening. A foot assembly on the support base rests on the inside of the steam generator to stabilize the support base. The installation tool is removed and a track assembly is attached to the support base. The waist/shoulder section of the arm is positioned on the track. A motor driven gear on the waist/shoulder section drives the waist/shoulder section up the track into the steam generator until the end of the waist/shoulder is at the manway opening. The elbow/wrist section of the arm is attached to the waist/shoulder section. These assembled sections are driven from the track onto the support base to allow removal of the track assembly. The tool coupling end of the arm sections is then caused to extend out of the steam generator through the manway for attachment of the necessary tool. The manipulator arm (waist/shoulder and elbow/wrist sections) is a four degree-of-freedom anthropomorphic design used in an elbow-up configuration. Electric and pneumatic motors in the assembly are remotely controlled through cables. The elbow/wrist assembly contains a coupling with direct electrical and pneumatic connections for tooling to eliminate the need for power cables to the tooling.

BRIEF DESCRIPTION OF THE DRAWINGS

For a further understanding of the nature and objects of the present invention, reference should be made to the following description taken in conjunction with the accompanying drawings in which like parts are given like reference numerals, and wherein:

FIG. 4 is a side view of the track assembly of the invention taken along lines 4—4 of FIG. 5

FIG. 5 is a plan view of a portion of the track assembly of the invention.

FIG. 6 is an end view of the track assembly taken along lines 6—6 of FIG. 5.

DETAILED DESCRIPTION OF THE PREFERRED EMBODIMENT

Figure 1:
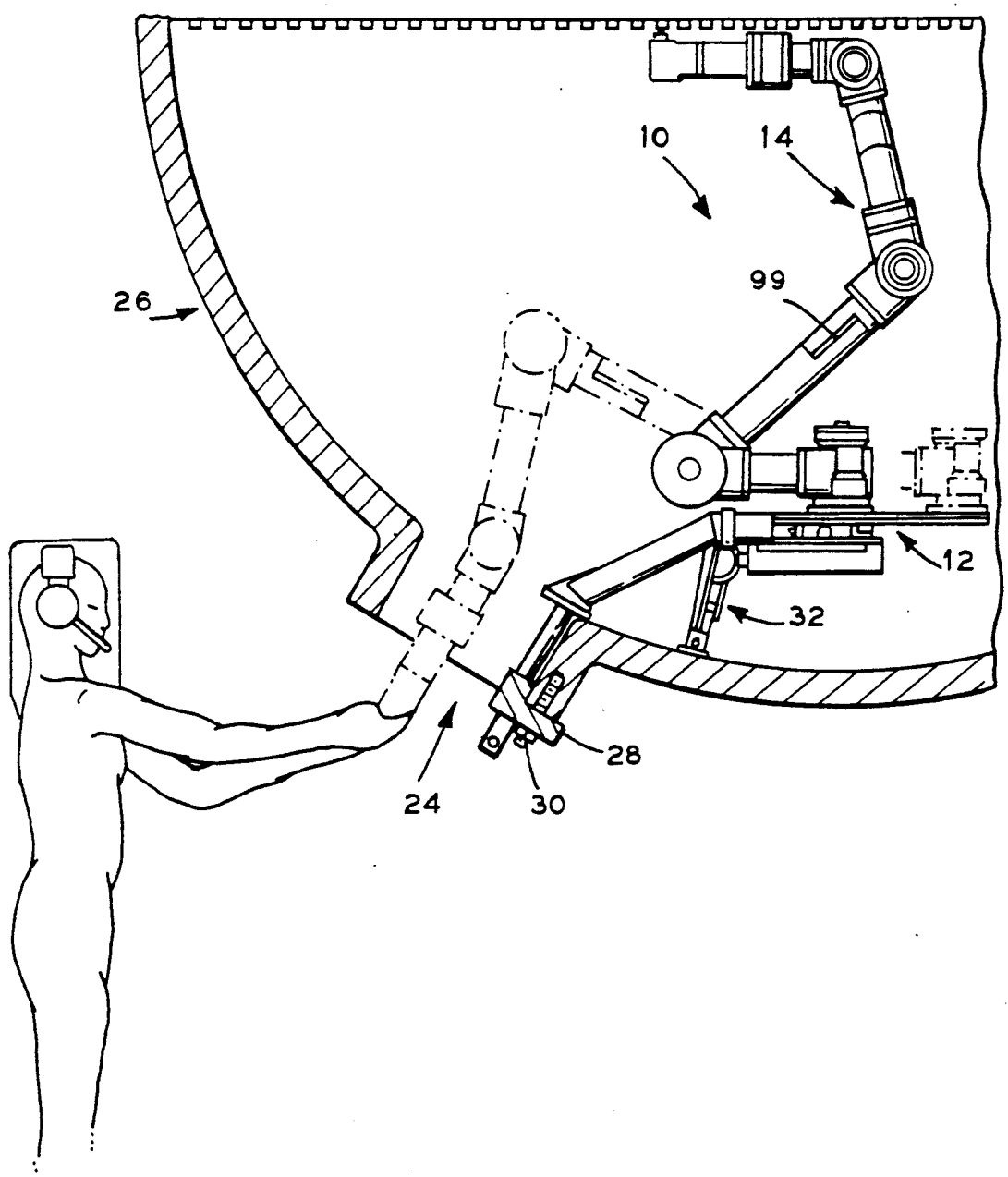
FIG. 1 is a view illustrating the invention in its installed position in a steam generator.
Figure 2:
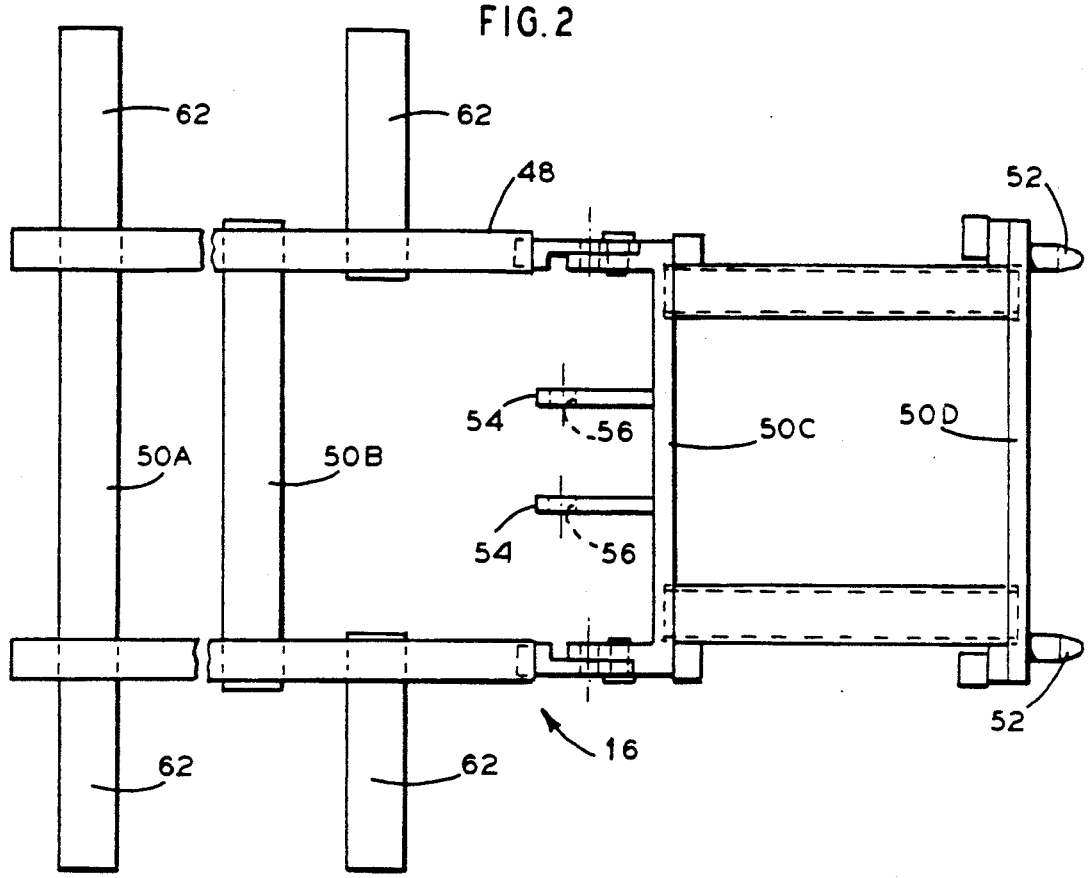
FIG. 2 is a plan view of the loading tool assembly of the invention.

Referring to the drawings, it is seen in FIG. 1 that the invention is generally indicated by the numeral 10. Tool positioning assembly 10 is generally comprised of support base 12, arm 14, loading tool assembly 16 (FIG. 2), and track assembly 18 (FIG. 4–6).

Figure 7:
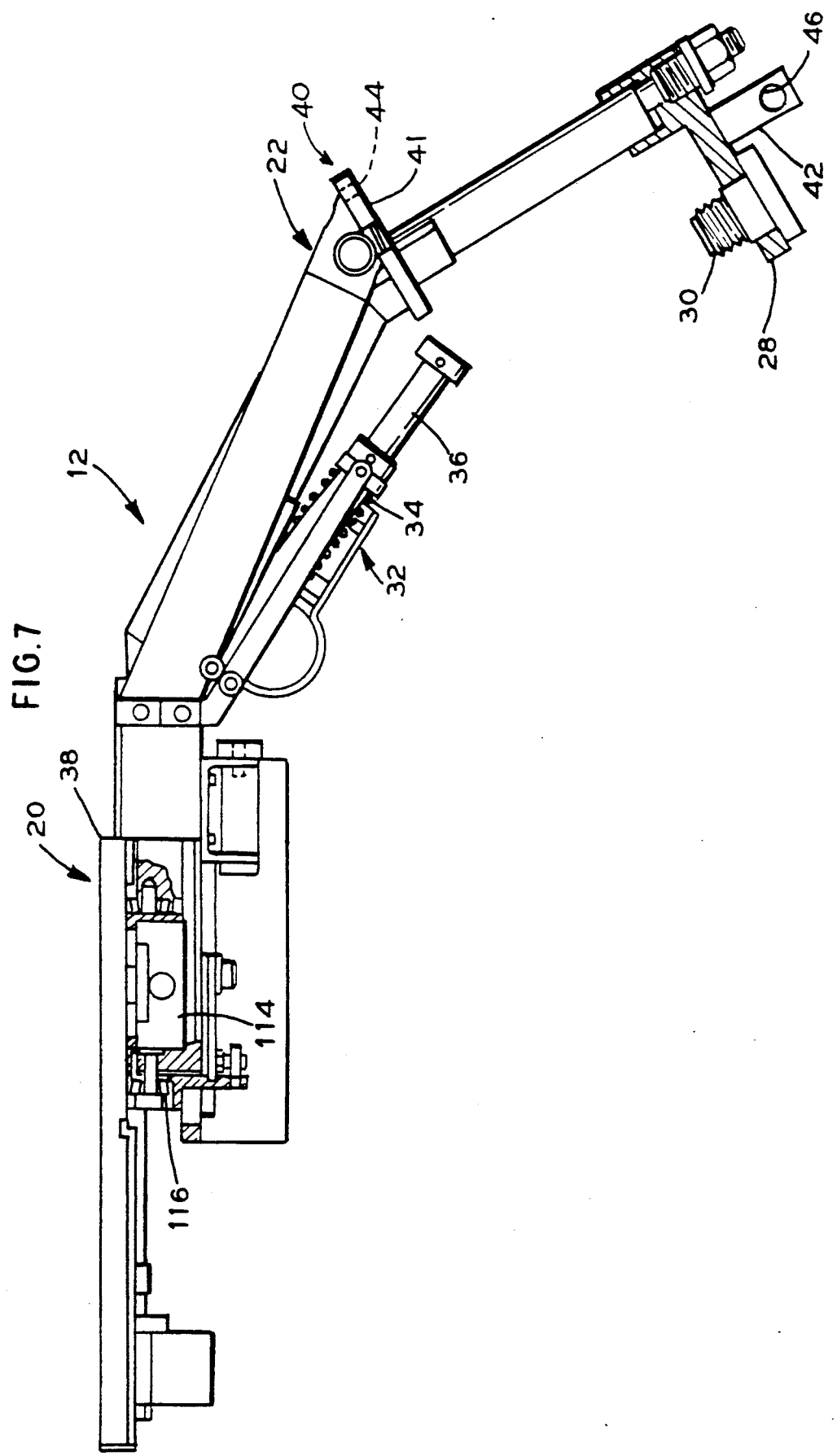
FIG. 7 is a side view of the support base of the invention.

Support base 12 is best seen in FIG. 7. Support base 12 is formed from table 20 and beam 22. Table 20 is attached at one end to beam 22. Beam 22 extends downwardly from table 20 at an angle. The midsection of beam 22 is provided with a bend whereby the lower portion of beam 22 extends downwardly at a steeper angle than the upper portion of beam 22. The end of the lower portion of beam 22 is provided with means for attaching support base 12 to the manway 24 of a steam generator 26. Plate 28 is attached to the end of the lower portion of beam 22 and extends at a right angle thereto. Plate 28 is provided with a bore through which bolt 30 is received. As seen in FIG. 1, when mounting support base 12 on steam generator 26, the lower portion of beam 22 rests against the inside wall of manway 24 and plate 28 is positioned against the outer edge of manway 24. Bolt 30 is threaded into one of the threaded bores in the wall of the steam generator 26 and manway 24 that are normally used to secure the manway cover in position while the system is in operation. Means for providing additional support to support base 12 while inside steam generator 26 is provided in the form of a retractable foot assembly 32. FIG. 1 illustrates foot assembly 32 in its extended supporting position and FIG. 7 illustrates foot assembly 32 in its retracted position. Spring 34 is used to retain foot assembly 32 in its retracted position during insertion into and removal of support base 12 from steam generator 26. After support base 12 is inserted into steam generator 26, foot assembly 32 is caused to be lowered by a motor, not shown, into an extended supporting position whereby its lower end is in contact with steam generator 26. In the preferred embodiment, spring 34 is arranged such that it relaxes just as foot assembly 32 is fully extended. This allows a single motor to be used to cause extension and retraction of foot assembly 32. Leg 36 may also be designed for a telescoping action relative to foot assembly 32. As best seen in FIG. 7, foot assembly 10 is pivotally attached to support base 12 at or near the junction of table 20 and beam 22. Table 20 is provided with a pair of side rails 38, one on each side. Each side rail is provided with a horizontal portion that extends inwardly toward the center of table 20. The purpose of the side rails is to retain manipulator 14 in position on table 20. This function will be more fully explained below. Support base 12 is provided with means for attaching loading tool assembly 16 and track assembly 18 thereto in the form of attachment points 40, 42. First attachment point 40 is a pair of cylinders, one mounted on each side of table 20, with each having an axial bore 44. Second attachment point 42 is a pair of flanges attached to plate 28, each flange having a bore 46 therethrough.

Figure 3:
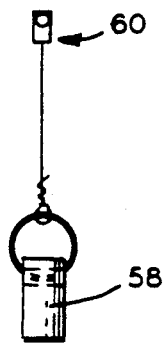
FIG. 3 is a view of the locking pin used with the loading tool assembly and track assembly of the invention.

Loading tool assembly 16 attaches to support base 12 to allow support base 12 to be positioned inside steam generator 26 without the need for the operator to enter steam generator 26 through manway 24. As seen in the partially broken plan view of FIG. 2, loading tool assembly 16 is formed from a generally rectangular frame 48 (in plan view) having cross supports 50A,B,C,D. Cross support 50D has a pin 52 that extends from each end thereof. Pins 52 are sized to be received in axial bores 44 of the manway front plate 41 on support base 12. Cross support 50C is provided with a pair of flanges 54 that extend therefrom. Flanges 54 are provided with coaxial bores 56. Bores 56 are sized to receive pin 58 illustrated in FIG. 3. Pin 58 may have a lanyard 60 attached thereto to facilitate removal from bores 56 and to preclude loss or detachment from the tool. Bores 46 in flanges 42 on support base 12 are also sized to receive pin 58. Loading tool assembly 16 is sized and shaped such that bores 56 in flanges 54 are in coaxial alignment with bores 46 in flanges 42 of support base 12 when pins 52 are received in bores 44 of manway front plate 44. Insertion of pin 58 through bores 46 and 56 thus locks loading tool assembly 16 to support base 12. This allows the operator to use handles 62 on loading tool assembly 16 to insert support base 12 through manway 24 into steam generator 26, position plate 28 against the outer edge of manway 24, and fasten support base 12 to steam generator 26 without physically breaking the plane of manway 24. After support base 12 is attached to steam generator 26, lanyard 60 is used to remove pin 58 from bores 46 and 56. Loading tool assembly 16 is then removed form support base 12 and track assembly 18 is inserted into steam generator 26 and attached to support base 12 in the same manner as loading tool assembly 16.

Track assembly 18, FIG. 4–6, is provided with a pair of pins 64 and flanges 66. Each flange has a bore 68 therethrough. As with loading tool assembly 16, track assembly 18 is sized and shaped such that pins 64 and flanges 66 respectively mate with bores 44 and flanges 42 for attaching track assembly 18 to support base. Pin 58 is inserted through bores 46 and 68 to secure the two assemblies together. Track assembly 18 is shaped to generally match the upper curvature of support base 12 and is provided with side rails 70. Both side rails 70 are provided with a slot 72 that extends along their length. This is related to retaining the manipulator assembly 14 on track assembly 18 during loading of the manipulator assembly 14 and will be more fully explained below. Side rails 70 are supported by a plurality of cross ties 74. Rack 76, which is a bar having a plurality of teeth along its length for engaging a gear, is attached to cross ties 74 and extends along the length of track assembly 18. A pivoting locking mechanism 78 is provided on each side rail 70 above flanges 66 to provide access to slots 72 for loading arm 14 onto track assembly 18 and to prevent arm 14 from disengaging from track assembly 18 before it has begun traveling along track assembly 18.

Figure 8:
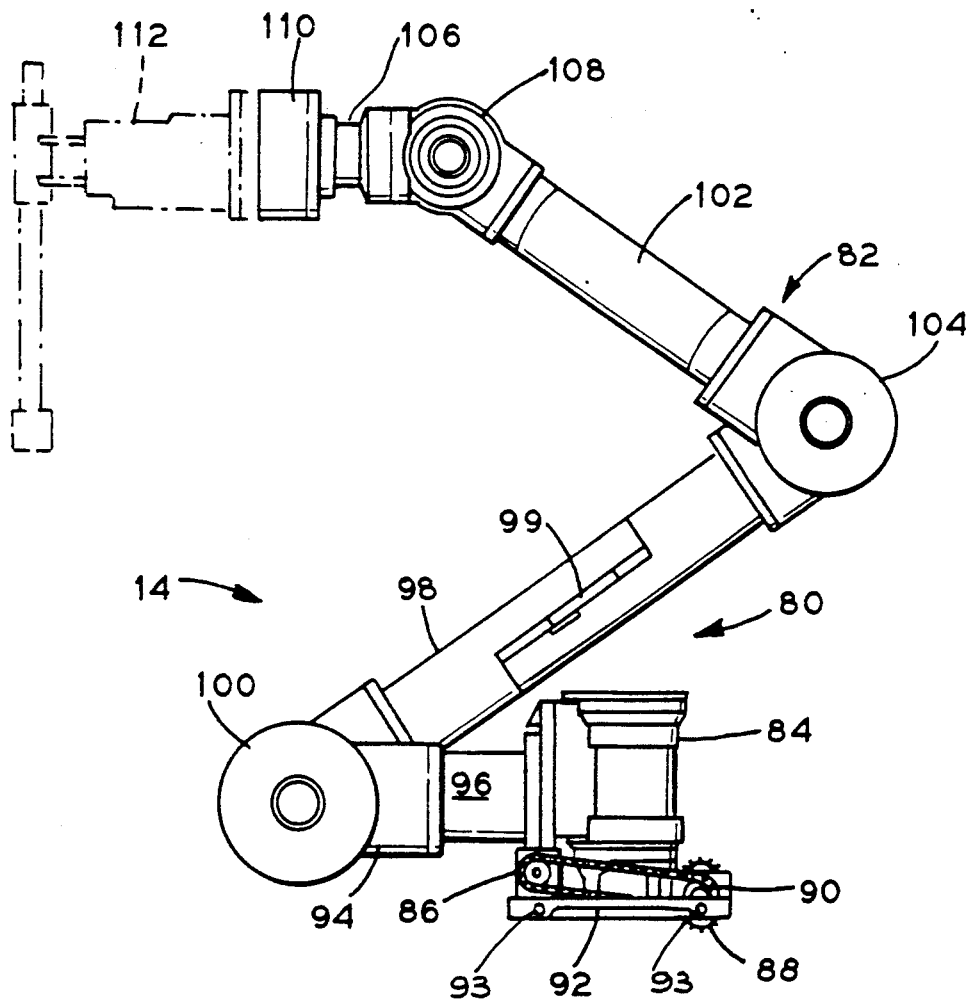
FIG. 8 is a side view of the arm assembly of the invention.

Arm 14, FIG. 8, is comprised of waist/shoulder assembly 80 and elbow/wrist assembly 82. Waist 84 contains a trolley motor 86 that drives chain 90. Chain 90 is engaged with cogwheel 88 for driving cogwheel 88. Cogwheel 88 has gears thereon that are sized to match the spacing between the teeth on rack 76 on track assembly 18. Waist 84 is rotatably mounted on base 92 and contains a motor for rotating waist 84 thereon. Base 92 is provided with guide pins 93 (1 in each corner), two of which are seen in FIG. 8. Each guide pin 93 is sized to fit within slot 72 of track assembly 18 and beneath the horizontal portion of each side rail 38 On table 20 of support base 18. This serves as a means for retaining arm 14 on track assembly 18 or support base 12. Arm 14 is a four degree-of-freedom anthropomorphic design used in an elbow-up configuration. First arm link 96 is attached to a rotatable waist 84. Second arm link 98 is pivotally attached to the shoulder joint 100. The third arm link 102 is pivotally attached to second arm link 98 at elbow joint 104. In the preferred embodiment, second arm link 98 is designed as a two part assembly that is attached together along line 99. This facilitates handling and installation and removal of arm 14 into and out of steam generator 26. Tool link 106 is pivotally attached to third arm link 102 by wrist joint 108. Tool link 106 is also rotatably attached to wrist joint 108. Tool link 106 has tool coupling 110 attached thereto. Tool coupling 110 is designed for easy attachment to and detachment from the variety of tools used in steam generator work. A typical tool 112 is shown in phantom view.

In operation, loading tool assembly 16 is attached to support base 12 by inserting pins 52 into bores 44, aligning bores 46 and 56, and inserting pin 58 through bores 46 and 56. The operator then uses handles 62 on loading tool assembly 16 to insert support base 12 through manway 24 into steam generator 26 without the need for the operator to enter steam generator 26. Plate 28 is fitted against the outer surface of the manway opening as seen in FIG. 1 and bolt 30 is threaded into an existing threaded bore normally used to secure a manway cover in place. Retractable foot assembly 32 is caused to pivot downward into contact with the interior of steam generator 26 to prevent bending or flexing of support base 12. Movements of foot assembly 32, the motor that drives chain 86, and all motions of manipulator 14 are actuated and controlled remotely by remote control cables not shown that are attached at one end to power supplies and control mechanisms and at the opposite end to tool positioning assembly 10. Tool positioning assembly 10 is provided with a combination of electrically and pneumatically operated motors. Pin 58 is removed and loading tool assembly 16 is moved out of contact with support base 12 and out of steam generator 26. Track assembly 18 is then inserted into steam generator 26 and attached to support base 12 in the same manner as loading tool assembly 16 as described above. Locking mechanisms 78 on side rails 70 are pivoted upward to provide access to slots 72 in side rails 70. Waist 84 of arm 14 is loaded onto track assembly 18 such that guide pins 93 are received in slots 72. Locking mechanisms 78 are then pivoted downwardly and locked in this position to prevent waist 84 from disengaging from track assembly 18. When waist 84 is in position on track assembly 18 cogwheel 88 is aligned and in contact with rack 76 such that the gears on cogwheel 88 may be engaged with the teeth on rack 76. The trolly motor 86 is remotely actuated to drive chain 90 and cause rotation of cogwheel 88. Cogwheel 88 thus drives waist 84 up track assembly 18 into steam generator 26. During this process, the position of the center portion of second arm link 98 is controlled to keep it within manway 24. Waist 84 is stopped on track assembly while a portion of second arm link 98 extends through manway 24. The remainder of arm 14 is installed by attaching the second part of second arm link 98 along line 99. Cogwheel 88 is then used to drive arm 14 the rest of the way up track assembly 18 and onto table 20. Table 20 is provided with the same type of rack as on track assembly 18 that is aligned with rack 76 when track assembly 18 is attached to support base 12. This allows the arm 14 to be readily driven from track assembly 18 onto table 20. Track assembly 18 is removed after arm 14 is driven onto table 20. As seen in phantom view of FIG. 1, arm 14 is then positioned to allow the operator to attach a tool to tool coupling 110 without the need for the operator to enter steam generator 26. As seen by the solid line view of FIG. 1, arm 14 is then repositioned to do the necessary work on the tubes and tubesheet of steam generator 26. Since it is important that tools be at the proper angle to access a tube, table 20 is provided with means for rotation about its longitudinal axis in the form of drive motor 114 and gear 116. Table 20 may be provided with a locking mechanism that holds waist 84 firmly in position on table 20. Table 20 may be provided with inclinometers that are used to determine and adjust the position of table 20 by the use of foot assembly 32 and drive motor 114 and gear 116. Tool link 106 may also be provided with an inclinometer as an additional means of determining and adjusting the position of tool 112. Changing of tools is accomplished without the need for the operator to enter steam generator 26. After work inside steam generator 26 is completed, tool positioning assembly 10 is removed simply by reversing the order of installation steps.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as Invention is:

1. A tool positioning assembly for use inside a steam generator having a manway opening in the wall of the steam generator, said tool positioning assembly comprising:
   a. a support base that is attachable to a steam generator at the manway opening, said support base comprising:
      i. a beam; and
      ii. a table attached to one end of said beam so as to be rotatable relative to said beam;
   b. a retractable foot assembly pivotally attached to said beam;
   c. a loading tool assembly removably attachable to said support base for inserting said support base into a steam generator;
   d. a four degree-of-freedom are removably received on said support base;
   e. a track assembly removably attachable to said support base and adapted to receive said arm for removably attaching said arm to said support base;
   f. a tool coupling mounted on said arm and adapted to receive remotely controlled tools.

2. The tool positioning assembly of claim 1, wherein said arm is provided with a driven cogwheel that engages said track assembly and said support base whereby said arm may be selectively driven and positioned along said track assembly and said support base.

* * * * *